United States Patent
Ahn (10) Patent No.: US 9,337,916 B2
(45) Date of Patent: May 10, 2016

(54) RADIO REPEATER APPARATUS AND SYSTEM, AND OPERATING METHOD THEREOF

(71) Applicant: AIRPOINT CO., LTD., Daejeon (KR)

(72) Inventor: Byungyang Ahn, Daejeon (KR)

(73) Assignee: AIRPOINT CO., LTD., Daejeon (KR)

( * ) Notice: Subject to any disclaimer, the term of this patent is extended or adjusted under 35 U.S.C. 154(b) by 124 days.

(21) Appl. No.: 14/142,473

(22) Filed: Dec. 27, 2013

(65) Prior Publication Data

US 2015/0124693 A1    May 7, 2015

(30) Foreign Application Priority Data

Nov. 6, 2013    (KR) .................. 10-2013-0134167

(51) Int. Cl.
*H04B 7/155* (2006.01)
*H04B 7/04* (2006.01)
*H04B 7/10* (2006.01)

(52) U.S. Cl.
CPC .......... *H04B 7/15564* (2013.01); *H04B 7/0413* (2013.01); *H04B 7/10* (2013.01)

(58) Field of Classification Search
CPC .................................................. H04B 7/15564
See application file for complete search history.

(56) References Cited

U.S. PATENT DOCUMENTS

| 2009/0323582 | A1 | 12/2009 | Proctor, Jr. et al. | |
| 2010/0062708 | A1 | 3/2010 | Sangiamwong et al. | |
| 2011/0292863 | A1* | 12/2011 | Braz | H04B 7/155 370/315 |
| 2012/0128038 | A1* | 5/2012 | Crilly, Jr. | H04B 7/155 375/211 |
| 2013/0044727 | A1* | 2/2013 | Nory | H04L 5/0092 370/330 |

FOREIGN PATENT DOCUMENTS

| JP | 2000-165339 | 6/2000 |
| JP | 2004-007338 | 1/2004 |
| JP | 2004-517549 | 6/2004 |
| JP | 2010-068151 | 3/2010 |
| JP | 2011-259158 | 12/2011 |
| JP | 2012-074824 | 4/2012 |
| JP | 2013-211887 | 10/2013 |
| KR | 1020090105985 | 10/2009 |
| KR | 1020110040602 | 4/2011 |
| WO | WO 02/054626 | 7/2002 |

OTHER PUBLICATIONS

Notice of Preliminary Rejection issued by the Japanese Patent Office on Sep. 2, 2014.

(Continued)

*Primary Examiner* — Wei Zhao
(74) *Attorney, Agent, or Firm* — IP & T Group LLP (57) ABSTRACT

A radio repeater system may include: a multiple input multiple output (MIMO) donor antenna configured to transmit/receive MIMO signals to/from base stations; a beamforming control unit configured to control beamforming by adaptively applying a phase weight to the repeated signals received from the MIMO donor antenna; an interference signal cancellation unit configured to estimate and analyze feedback interference signals introduced from a MIMO service antenna to the MIMO donor antenna and adaptively cancel the feedback interference signals; and the MIMO service antenna configured to transmit/receive MIMO signals to/from radio terminals in a service area.

15 Claims, 7 Drawing Sheets

(56) References Cited

OTHER PUBLICATIONS

Lee K. B., et al., Interference Cancellation Based on Adaptive Signal Processing for MIMO RF Repeaters, The Journal of Korea Information and Communications Society, Sep. 2010, pp. 735-742, vol. 35, No. 9.

Notice of Preliminary Rejection issued by the Korean Intellectual Property Office on Jul. 23, 2014.
Office Action issued by the Japanese Patent Office on May 14, 2015.
Office Action issued by the Japanese Patent Office on Oct. 20, 2015.
Notice of Allowance issued by the Japanese Patent Office on Mar. 15, 2016.

* cited by examiner

RADIO REPEATER APPARATUS AND SYSTEM, AND OPERATING METHOD THEREOF

CROSS-REFERENCE TO RELATED APPLICATIONS

The present application claims priority of Korean Patent Application No. 10-2013-0134167, filed on Nov. 6, 2013, which is incorporated herein by reference in its entirety.

BACKGROUND OF THE INVENTION

1. Field of the Invention

Exemplary embodiments of the present invention relate to a radio repeater apparatus and system, and an operating method thereof; and, more particularly, to a radio repeater apparatus and system, which is capable of strengthening a repeating target base station signal (target base station signal) among various base station signals which are mixed and received, and suppressing the other base station signals to reduce interference between the base station signals, in order to improve the repeating quality of downlink signals, and an operating method thereof.

2. Description of Related Art

In general, a radio repeater system is a system which receives and amplifies a downlink signal transmitted from a radio base station to a radio terminal or an uplink signal transmitted from a radio terminal to a radio base station and then transmits the amplified signal. The radio repeater system, is installed in the transmission section of the radio base station, in order to expand a service area and provide a smooth service to a radio shadow area.

At this time, in a cell-edge area or a base station-dense area in downtown, a donor antenna of a radio repeater system installed toward a target base station may not only receive a signal of the target base station, but may receive signals of other base stations. Such a phenomenon may occur in signals received by radio terminals. The signals received from the other base stations serve as interference signals which may cause radio interference when the same radio resource is used, and degrade the quality of the signals received by the terminals due to a frequency error between the respective base stations.

Figure 1:
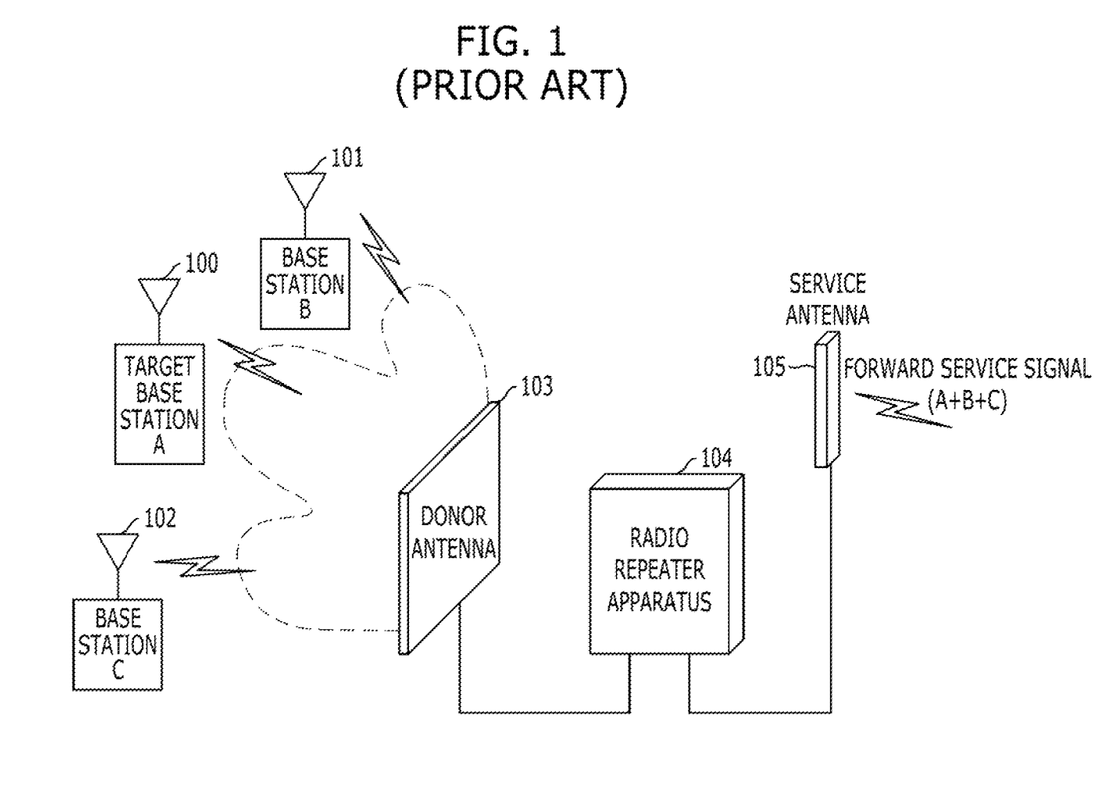
FIG. 1 is a configuration diagram of a conventional radio repeater system.

FIG. 1 is a configuration diagram of a conventional radio repeater system, illustrating the concept that the radio repeater system is operated in a base station interference environment.

Referring to FIG. 1, the conventional radio repeater system includes a donor antenna 103, a radio repeater apparatus 104, and a service antenna 105. The donor antenna 103 is configured to transmit/receive a signal to/from a base station. The radio repeater apparatus 104 is configured to amplify and repeat a base station signal and a terminal signal, which are inputted through the donor antenna 103 and the service antenna 105, respectively. The service antenna 105 is configured to transmit/receive a signal to/from a radio terminal in a service area.

In general, the radio repeater system is installed at positions at which the interference between base station signals frequently occurs. Thus, the donor antenna 103 may not only receive a signal of a target base station 100, but also receive signals of other base stations 101 and 102. At this time, the radio repeater system not only amplifies and transmits the signal of the target base station 100, but also amplifies and transmits the signals of the other base stations 101 and 102, which serve as interference signals. In this case, since the signal quality of the service area is degraded, the installation effect of the radio repeater system may not be obtained.

Furthermore, the frequency use efficiency of multiple input multiple output (MIMO) signals may be increased when signals passing through different channels have low correlation in a multi-path environment. However, the conventional radio repeater system operates according to a single input single output (SISO) system including one donor antenna 103 and one service antenna 105. Thus, although the base station operates according to the MIMO system, a signal repeated through the radio repeater system may not be distinguished from signals in different channel environments. In this case, the operation effect of the radio repeater system may not be obtained.

Furthermore, when isolation between the donor antenna 103 and the service antenna 105 is not sufficiently secured, a signal of the service antenna 105 may be introduced to the donor antenna 103 of the radio repeater system. That is, a feedback interference signal may be introduced. In this case, since the gain of the radio repeater system cannot be increased to inevitably reduce the coverage of the service area, the efficiency of the radio repeater system may decrease.

Therefore, the conventional radio repeater system has disadvantages in that the repeating quality of downlink signals is degraded, the frequency use efficiency is decreased, and the stability of repeated signals is reduced.

SUMMARY OF THE INVENTION

An embodiment of the present invention is directed to a radio repeater apparatus which is capable of performing digital phase control and operating adaptively in change of radio channel environment so as to cancel feedback interference signals, and an operating method thereof.

Another embodiment of the present invention is directed to a radio repeater system which includes beamforming array antennas applied as a donor antenna, has an adaptive digital phase control function and an adaptive feedback interference signal cancellation function, transmits MIMO signals in a repeating section, and operating adaptively in change of radio channel environment so as to cancel feedback interference signals, and an operating method thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a radio repeater system may include: a multiple input multiple output (MIMO) donor antenna configured to transmit/receive MIMO signals to/from base stations; a beamforming control unit configured to control beamforming by adaptively applying a phase weight to the repeated signals received from the MIMO donor antenna; an interference signal cancellation unit configured to estimate and analyze feedback interference signals introduced from a MIMO service antenna to the MIMO donor antenna and adaptively cancel the feedback interference signals; and the MIMO service antenna configured to transmit/receive MIMO signals to/from radio terminals in a service area.

In accordance with another embodiment of the present invention, a radio repeater apparatus may include: a receive (Rx) signal processing unit configured to receive and process downlink signals; a base station search unit configured to search base stations mixed in the downlink signals from the Rx signal processing unit, and select a repeating target base station; a beamforming control unit configured to acquire incident direction information of the base stations from the downlink signals provided from the Rx signal processing unit, and generate and synthesize a phase weight vector for the downlink signal of the repeating target base station based on the acquired incident direction information; an adaptive interference cancellation unit configured to cancel feedback interference signals contained in the downlink signals from the beamforming control unit; and a transmit (Tx) signal processing unit configured to process the downlink signals provided from the adaptive interference cancellation unit and transmit the processed signals.

In accordance with another embodiment of the present invention, an operating method, of a radio repeater system may include: receiving MIMO signals (repeated signals) from base stations; controlling beamforming by adaptively applying phase weights to the received repeated signals; estimating and analyzing feedback interference signals introduced to the received repeated signals and adaptively canceling the feedback interference signals; and transmitting MIMO signals to radio terminals in a service area.

In accordance with another embodiment of the present invention, an operating method of a radio repeater apparatus may include: receiving downlink signals and processing the received signals; searching base stations mixed in the processed downlink signals and selecting a repeating target base station; acquiring incident direction information of the base stations from the processed downlink signals, and generating and synthesizing a phase weight vector for the downlink signal of the repeating target base station, based on the acquired incident direction information; canceling feedback interference signals contained in the downlink signals synthesized with the phase weight vector; and processing the downlink signals from which the feedback interference signals are canceled, and transmitting the processed signals.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In this disclosure below, when one part is referred to as being 'connected' to another part, it should be understood that the former can be 'directly connected' to the latter, or 'electrically connected' to the latter via an intervening part. Furthermore, when it is described that one comprises (or includes or has) some elements, it should be understood that it may comprise (or include or has) only those elements, or it may comprise (or include or have) other elements as well as those elements if there is no specific limitation. In the entire disclosure, the terms of a singular form may include plural forms unless referred to the contrary.

Figure 2:
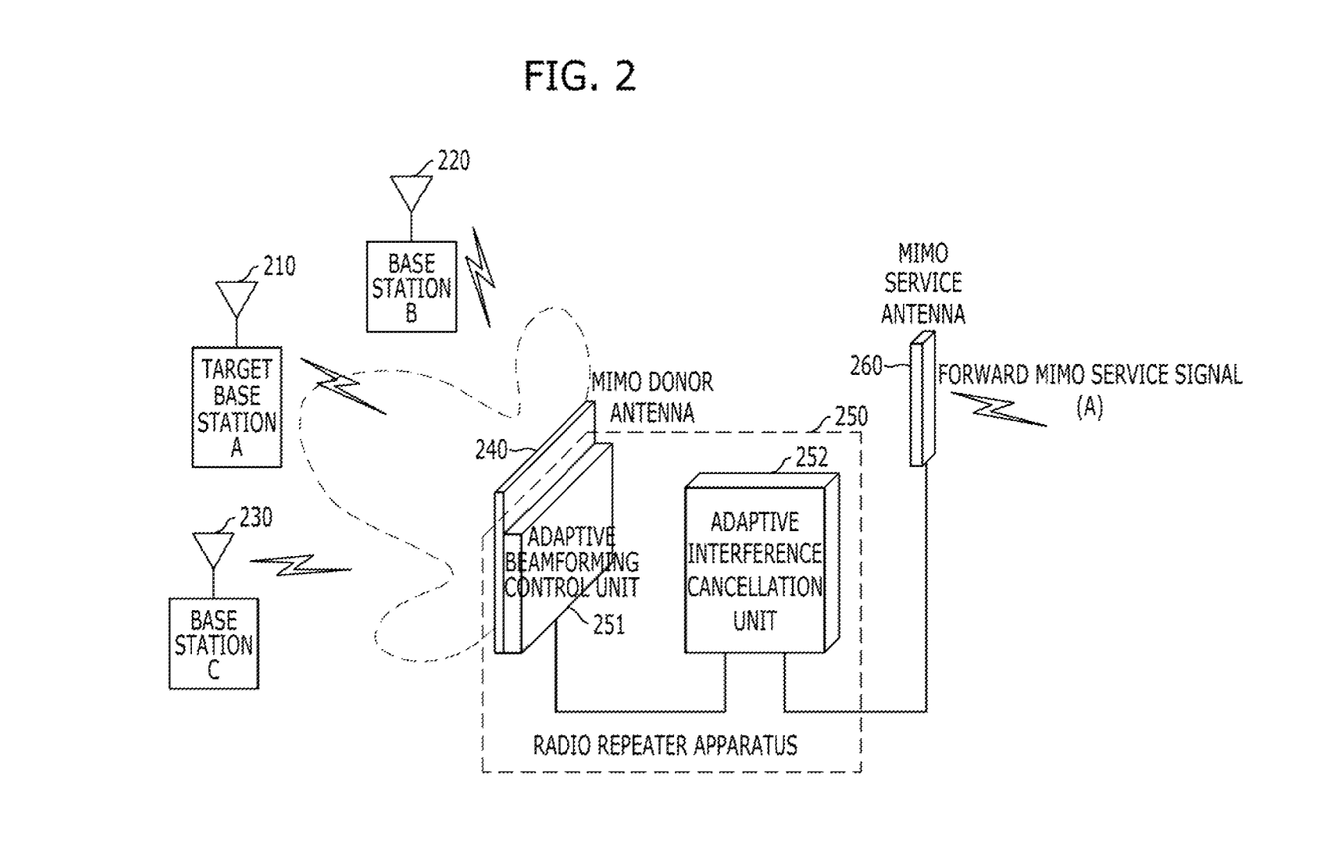
FIG. 2 is a configuration diagram of a radio repeater system in accordance with an embodiment of the present invention.

FIG. 2 is a configuration diagram of a radio repeater system in accordance with an embodiment of the present invention, illustrating the concept that the radio repeater system operates in a base station interference environment.

Referring to FIG. 2, the radio repeater system in accordance with the embodiment of the present invention may include a MIMO donor antenna 240, a beam forming control unit 251, an interference signal cancellation unit 252, and a MIMO service antenna 260. The MIMO donor antenna 240 is configured to transmit/receive MIMO signals to/from base stations. The beam forming control unit 251 is configured to control beamforming by adaptively applying a phase weight to the repeated signals received from the MIMO donor antenna 240. The interference signal cancellation unit 252 is configured to estimate and analyze feedback interference signals introduced to the MIMO donor antenna 240 from the MIMO service antenna 260 and adaptively cancel the feedback interference signals. The MIMO service antenna 260 is configured to transmit/receive MIMO signals to/from radio terminals in a service area. At this time, a radio repeater apparatus 250 may include the beam forming control unit 251 and the interference signal cancellation unit 252.

The MIMO donor antenna 240 includes beamforming array antennas which may be implemented by linearly arranging a plurality of dual polarization array antennas to receive horizontal polarization and vertical polarization signals from the base stations. For example, the MIMO donor antenna 240 may include n dual polarization array antennas where n is a natural number.

The beamforming control unit 251 traces a target base station signal from the downlink signals received through the MIMO donor antenna 240, and adaptively applies a phase weight to strengthen a target base station signal (repeating target base station signal) and suppress other base station signals, in order to control beamforming.

At this time, the MIMO donor antenna 240 and the beamforming control unit 251 may be integrated with each other. This is in order to avoid structural disadvantages, which may occur as the scale of power supply equipment is increased by the n dual polarization array antennas, through the integration.

Furthermore, signals received from a plurality of base stations through the MIMO donor antenna 240 may be repeated in a different manner from the conventional radio repeater system illustrated in FIG. 1. Specifically, beam may be formed for a target base station signal 210 by the operation of the MIMO donor antenna 240 and the beamforming control unit 251, and null points may be formed for other base station signals 220 and 230 which serve as interference signals. Through this operation, the target base station signal may be selectively repeated in a state where the interference between the base stations is excluded. At this time, the horizontal polarization and vertical polarization signals received through the MIMO donor antenna 240, that is, the plurality of dual polarization array antennas correspond to the MIMO signals, and are transmitted through the MIMO service antenna 260 after a phase conversion process and a feedback interference cancellation process are sequentially performed.

The radio repeater system in accordance with the embodiment of the present invention may repeat MIMO signals while strengthening a target base station signal among downlink signals received from a plurality of base stations through the MIMO donor antenna and suppressing signals received from other base stations, and cancel feedback interference signals occurring between the MIMO service antenna and the MIMO donor antenna.

Figure 3:
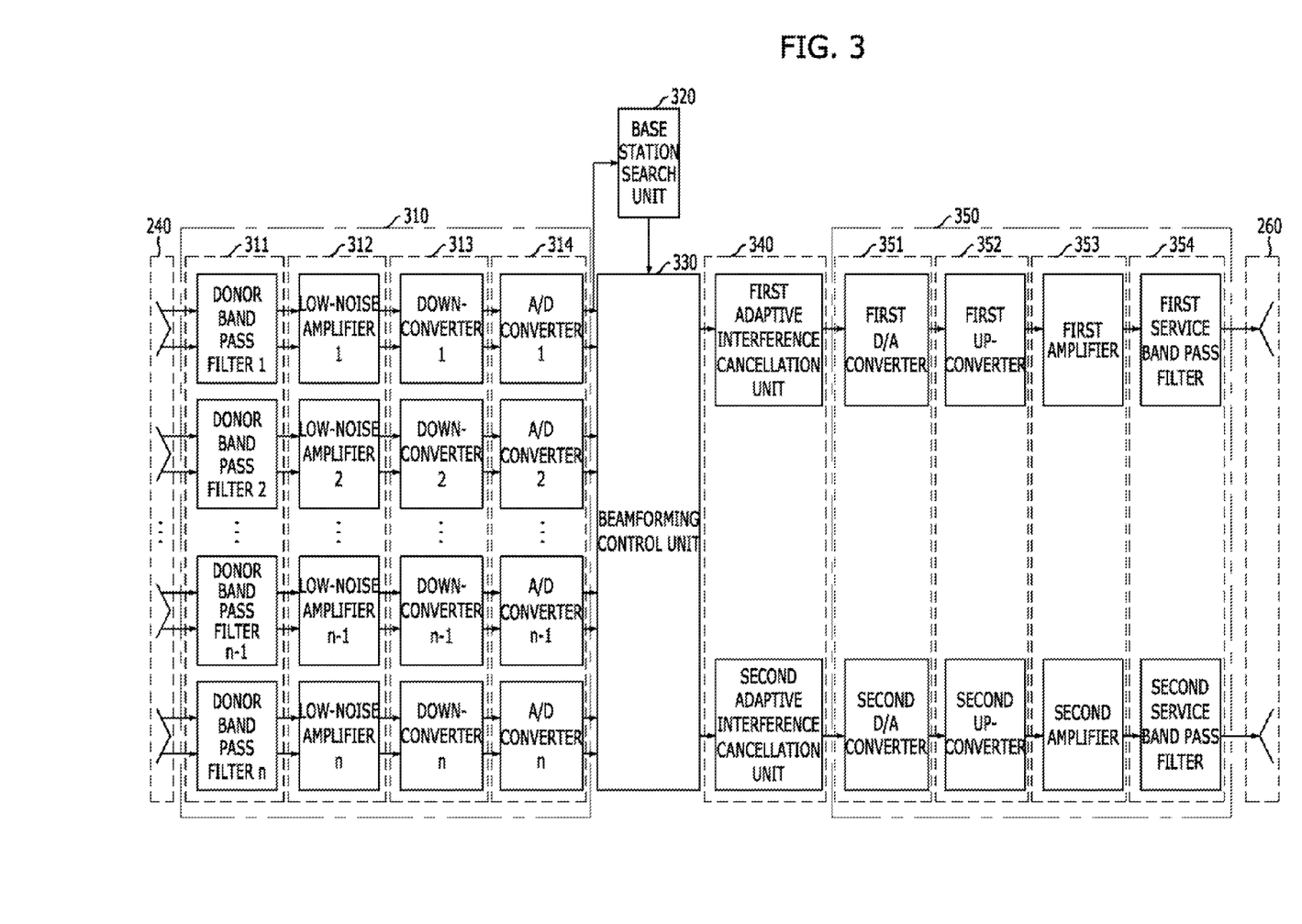
FIG. 3 is a detailed configuration diagram of a radio repeater apparatus in accordance with an embodiment of the present invention.

FIG. 3 is a detailed configuration diagram of the radio repeater apparatus in accordance with the embodiment of the present invention. In the following descriptions, a downlink signal will be taken as an example.

Referring to FIG. 3, the radio repeater apparatus in accordance with the embodiment of the present invention includes a receive (Rx) signal processing unit 310, a base station search unit 320, a beamforming control unit 330, an adaptive interference cancellation unit 340, and a transmit (Tx) signal processing unit 350. The Rx signal processing unit 310 is configured to receive and process downlink signals. The base station search unit 320 is configured to search base stations mixed in the downlink signals provided from the Rx signal processing unit 310 and select a repeating target base station. The beamforming control unit 330 is configured to acquire incident direction information of the base stations from the downlink signals from the Rx signal processing unit 310, and generate and synthesize a phase weight vector for the downlink signal of the repeating target base station on the basis of the incident direction information. The adaptive interference cancellation unit 340 is configured to cancel feedback interference signals contained in the downlink signals. The Tx signal processing unit 350 is configured to process the downlink signals provided from the adaptive interference cancellation unit 340 and transmit the processed signals.

The Rx signal processing unit 310 includes n donor band pass filters 311, n low-noise amplifiers 312, n down-converters 313, and n analog/digital (A/D) converters 314. The n donor band pass filters 311 are configured to band-pass filter the downlink signals received through the MIMO donor antenna 240. The n low-noise amplifiers 312 are configured to low-noise amplify the downlink signals filtered through the n donor band pass filters 311. The n down-converters 313 are configured to down-convert the downlink signals amplified through the n low-noise amplifiers 312. The n A/D converters 314 are configured to convert the analog downlink signals down-converted through the n down-converters 313 into digital downlink signals. At this time, the Rx signal processing unit 310 receives n horizontal polarization and vertical polarization signals from the MIMO donor antenna 240, that is, the dual polarization array antennas, and performs band filtering, low-noise amplification, down-conversion, and A/D conversion.

The base station search unit 320 is configured to search base stations mixed in the downlink signals provided from the A/D converters 314 of the Rx signal processing unit 310, and select a base station having the largest signal-to-noise ratio (SNR) among the searched base stations as the repeating target base station.

The beamforming control unit 330 is configured to acquire the incident, direction information of the base stations searched by the base station search unit 320 from the downlink signals provided from the A/D converters 314 of the Rx signal processing unit 310, and calculate (generate) and synthesize phase weight vectors on the basis of the acquired incident direction information such that the downlink signal of the repeating target base station selected by the base station search unit 320 has the maximum SNR.

The adaptive interference cancellation unit 340 is configured to cancel feedback interference signals existing in the downlink signals by adjusting the gains and phases of the downlink signals. For this operation, the adaptive interference cancellation unit 340 includes a first adaptive interference cancellation section and a second adaptive interference cancellation section. The first adaptive interference cancellation section is configured to detect and cancel feedback interference signals from the horizontal polarization signals synthesized by the beamforming control unit 330, and the second adaptive interference cancellation section is configured to detect and cancel feedback interference signals from the vertical polarization signals synthesized by the beamforming control unit 330. Furthermore, the adaptive interference cancellation unit 340 includes a feedback interference signal detection section, a negative feedback interference signal detection section, and a feedback interference signal cancellation section, which are not illustrated in FIG. 3. The feedback interference signal detection section is configured to detect the phases and magnitudes of feedback interference signals from the downlink signals provided from the beamforming control unit 330 and containing the feedback interference signals. The negative feedback interference signal generation section is configured to generate negative feedback interference signals of the feedback interference signals contained in the downlink signals, using the phases and magnitudes of the feedback interference signals received from the feedback interference signal detection section. The feedback interference signal cancellation section is configured to synthesize the downlink signals and the negative feedback interference signal generated from the negative feedback interference signal generation section and transfer the downlink signals, from which the feedback interference signals were cancelled, to the Tx signal processing unit 350. The adaptive interference cancellation unit 340 may be configured to cancel feedback interference signals contained in uplink signals as well as the feedback interference signals contained in the downlink signals.

The Tx signal processing unit 350 includes a digital/analog (D/A) converter 351, an up-converter 352, an amplifier 353, and a service band pass filter 354. The D/A converter 351 is configured to convert the digital downlink signals, from which the feedback interference signals were canceled by the adaptive interference cancellation unit 340, into analog downlink signals. The up-converter 352 is configured to up-convert the analog downlink signals converted by the D/A converter 351. The amplifier 353 is configured to amplify the downlink signals up-converted by the up-converter 352. The service band pass filter 354 is configured to band-filter the downlink signals amplified by the amplifier 353. At this time, the Tx signal processing unit 350 performs D/A conversion, up-conversion, amplification, and band-filtering on the horizontal polarization and vertical polarization signals from which the feedback interference signals were canceled by the adaptive interference cancellation unit 340.

Figure 4:
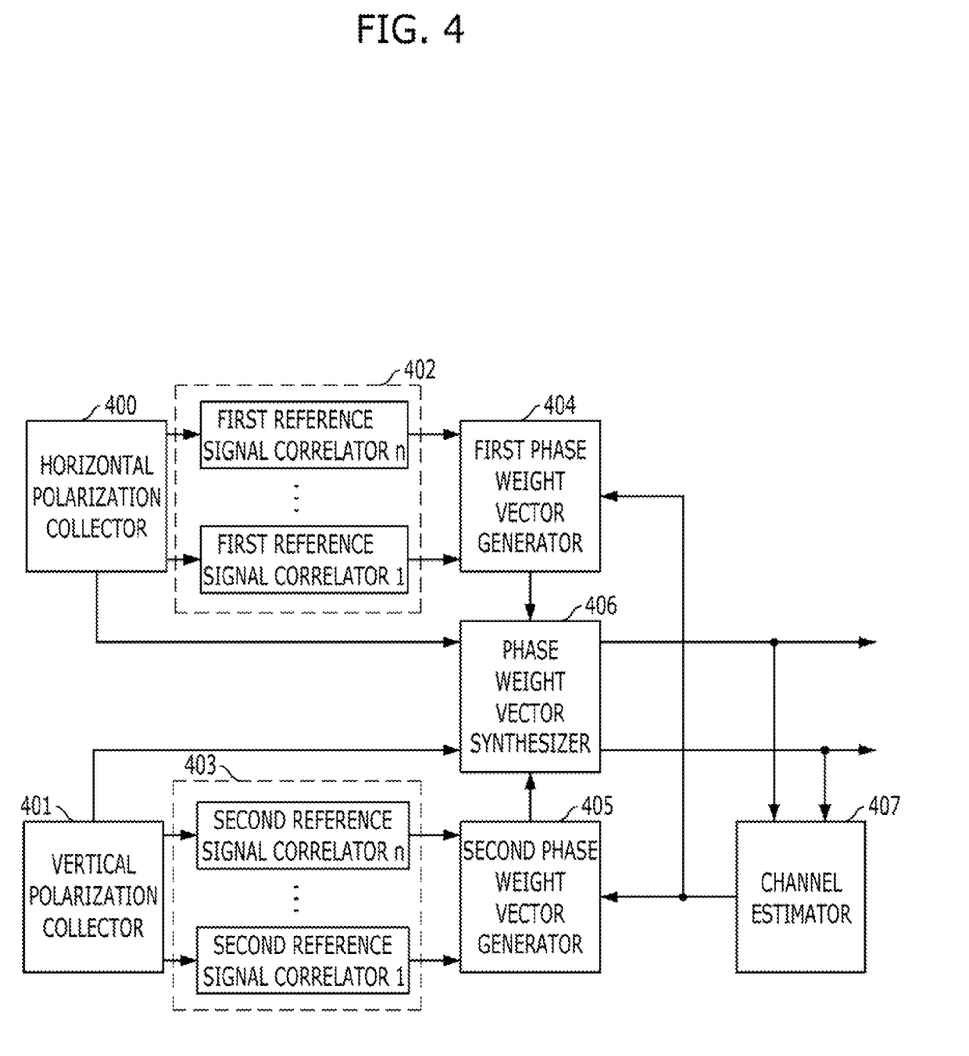
FIG. 4 is a detailed configuration diagram of a beamforming control unit in accordance with the embodiment of the present invention.

FIG. 4 is a detailed configuration diagram of the beamforming control unit in accordance with the embodiment of the present invention.

Referring to FIG. 4, the beamforming control unit 330 in accordance with the embodiment of the present invention includes a horizontal polarization collector 400, a first reference signal correlator 402, a first phase weight vector generator 404, a vertical polarization collector 401, a second reference signal correlator 403, a second phase weight vector generator 405, a phase weight vector synthesizer 406, and a channel estimator 407. The horizontal polarization collector 400 is configured to collect horizontal polarization signals from the Rx signal processing unit 310. The first reference signal correlator 402 is configured to generate correlation values between the horizontal polarization signals provided from the horizontal polarization collector 400 and a first reference signal corresponding to horizontal polarization. The first phase weight vector generator 404 is configured to estimate first phase vectors of the searched base stations from the correlation values provided from the first reference signal correlator 402, and generate phase weight vectors from the estimated first phase vectors such that the repeating target base station has the maximum SNR. The vertical polarization collector 401 is configured to vertical polarization signals from the Rx signal processing unit 310. The second reference signal correlator 403 is configured to generate correlation values between the vertical polarization signals provided from the vertical polarization collector 401 and a second reference signal corresponding to vertical polarization. The second phase weight vector generator 405 is configured to estimate second phase vectors of the searched base stations from the correlation values provided from the second reference signal correlator 403, and generate phase weight vectors from the estimated second phase vectors such that the repeating target base station has the maximum SNR. The phase weight vector synthesizer 406 is configured to synthesize the n horizontal polarization and vertical polarization signals provided from the Rx signal processing unit 310 and the phase weight vectors generated from the first and second phase weight vector generators 404 and 405. The channel estimator 407 is configured to provide channel response correlation values of the synthesized horizontal polarization and vertical polarization signals outputted from the phase weight vector synthesizer 406 to the first and second phase weight vector generators 404 and 405, in order to generate the phase weight vectors such that channel response of the synthesized horizontal polarization signals is independent of channel response of the synthesized vertical polarization signals.

Figure 5:
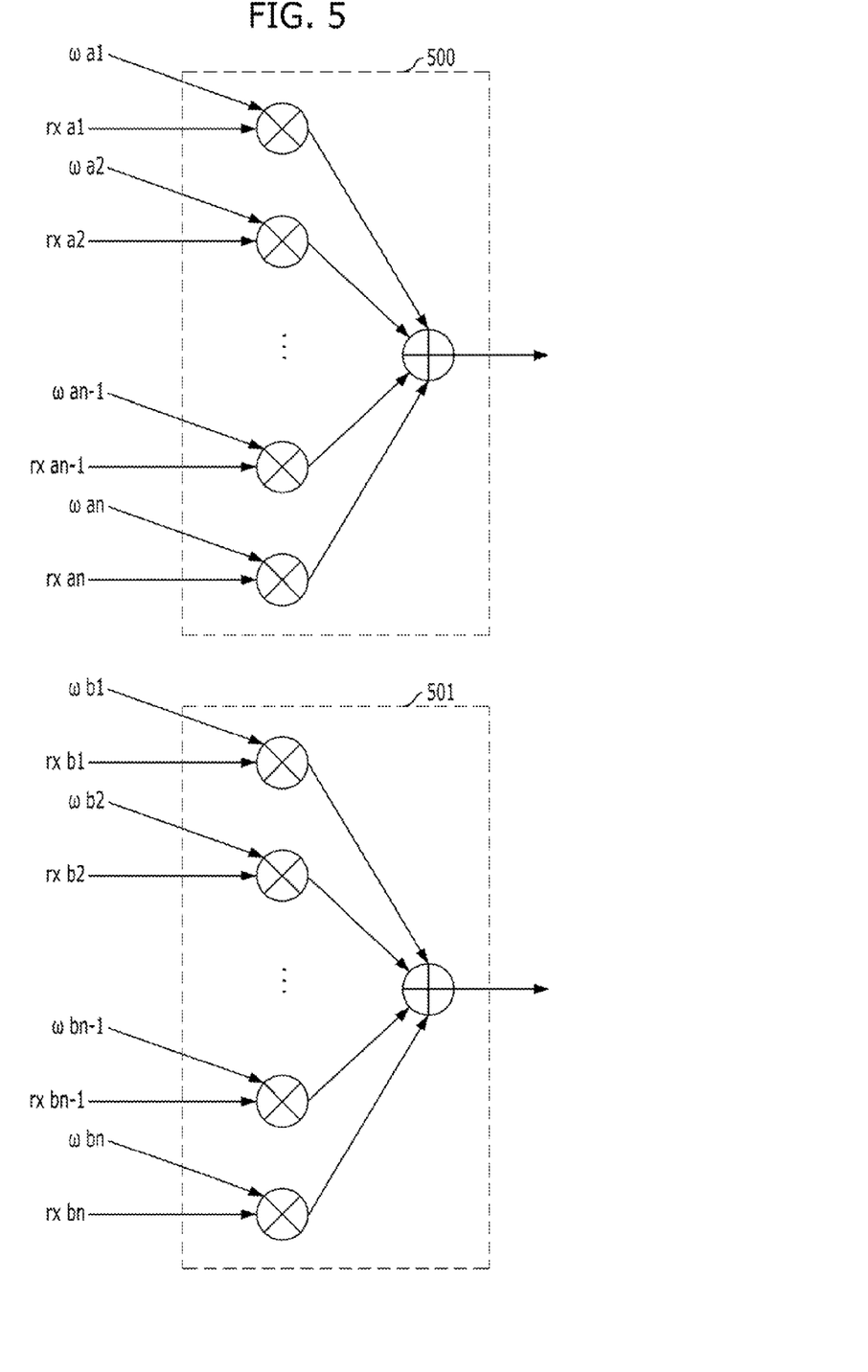
FIG. 5 is a detailed configuration diagram of a phase weight vector synthesizer in accordance with the embodiment of the present invention.

FIG. 5 is a detailed configuration diagram of the phase weight vector synthesizer in accordance with the embodiment of the present invention.

Referring to FIG. 5, the phase weight vector synthesizer 406 in accordance with the embodiment of the present invention includes a first phase weight vector synthesizer 500 and a second phase weight vector synthesizer 501. The first phase weight vector synthesizer 500 is configured to synthesize the n horizontal polarization signals rx a1 to rx an provided from the Rx signal processing unit 310 and the n phase weight vectors ω a1 to ω an generated from the first phase weight vector generator 404, and the second phase weight vector synthesizer 501 is configured to synthesize the n vertical polarization signals rx b1 to rx bn provided from the Rx signal processing unit 310 and the n phase weight vectors ω b1 to ω bn generated from the second phase weight vector generator 405. At this time, each of the phase weight vector synthesizers 500 and 501 may be implemented using a plurality of multipliers and one adder.

Now, the process in which downlink signals are repeated in accordance with the embodiment of the present invention will be described as follows. First, n vertical polarization and vertical polarization signals received through the n array antennas of the MIMO donor antenna 240 are processed through power supply units (not illustrated) of the antennas and the n donor band-pass filters 311, the n low-noise amplifiers 312, the n down-converters 313, and the n A/D converters 314 of the Rx signal processing unit 310 illustrated in FIG. 3, and correspond to MIMO-path signals, respectively.

The base station search unit 320 searches base stations mixed in received downlink signals, using one of digital converted signals of the n horizontal polarization and vertical polarization signals, outputted from the Rx signal processing unit 310. At this time, the base station search unit 320 may search base stations using information such as the IDs of the base stations, received through a base station search process performed in radio terminals. During the base station search process, the base station search unit 320 may select a base station having the largest SNR as a repeating target base station. At this time, different reference signals may be generated for the respective base stations from the base station IDs acquired through the base station search process. The reference signals may be given as different values for the respective MIMO Tx antennas of the base station, in order to promote channel estimation of the MIMO signal paths. In the present embodiment, the values are distinguished as first and second reference signals.

The first reference signal correlator 402 of the beamforming control unit 330 illustrated in FIG. 4 generates n correlation values between the n horizontal polarization signals 400 received through the MIMO donor antenna 240 and the first reference signals of the respective base stations, corresponding to the horizontal polarization of the MIMO signals among the reference signals of the searched base stations. The first phase weight vector generator 404 estimates phase vectors of the searched base stations from the n correlation values, and generates phase weight vectors such that the repeating target base station has the maximum SNR. At this time, an adaptive algorithm such as LMS may be used. Furthermore, the second reference signal correlator 403 generates correlation values between the vertical polarization signals 401 and the second reference signals of the respective stations, and the second phase weight vector generator 405 generates phase weight vectors for the vertical polarization signals. The received n horizontal polarization and vertical polarization signals and the phase weight vectors corresponding to the respective Rx paths are synthesized in such a manner as illustrated in FIG. 5, and become the synthesized horizontal polarization signals and the synthesized vertical polarization signals.

The radio repeater apparatus and the repeating target base station may be set in a LOS environment. Thus, the synthesized horizontal polarization and vertical polarization signals corresponding to the paths of the MIMO signals have the same or similar channel response during the downlink signal receiving process or the phase synthesizing process, radio terminals cannot separate the MIMO signals from the downlink signals. Thus, in order to generate phase weight vectors at which channel response of the synthesized horizontal polarization signals is independent of the synthesized vertical polarization signals, the channel estimator 407 provides the channel response correlation values of the synthesized horizontal polarization and vertical polarization signals provided from the phase weight vector synthesizer 406 to the first and second phase weight vector generators 404 and 405.

Furthermore, the output signals of the phase weight vector synthesizer 406 correspond, to the respective ports of the MIMO service antennas 260. Thus, the Tx signal processing unit 350 including the D/A converter 351, the up-converter 352, the amplifier 353, and the service band pass filter 354 may be implemented in such a manner as to correspond to each of the ports.

Furthermore, since feedback interference signals introduced to the MIMO donor antennas 240 from the MIMO service antenna 260 have different magnitudes and phases, adaptive interference cancellation units may be implemented to correspond to the MIMO signal paths like the adaptive interference cancellation unit 340.

Figure 6:
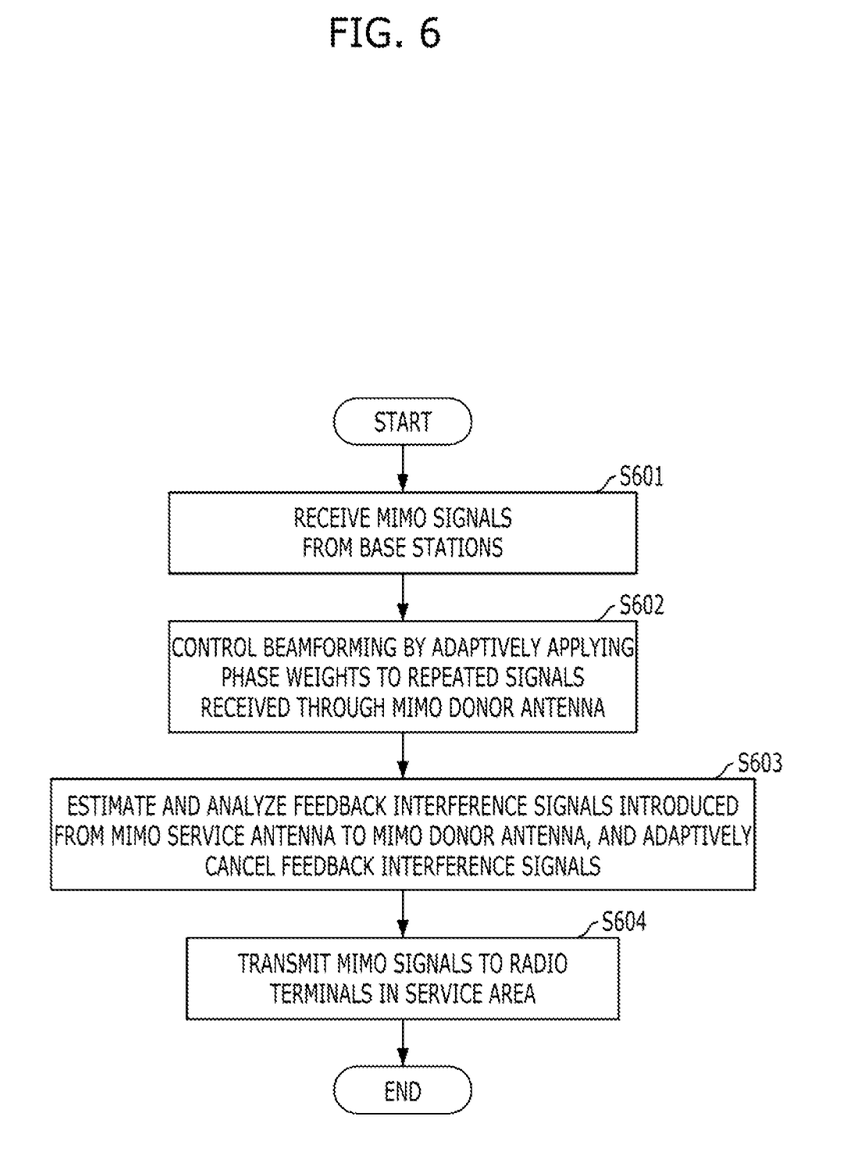
FIG. 6 is a flowchart for an operating method of a radio repeater system in accordance with an embodiment of the present invention.

FIG. 6 is a flowchart for an operating method of a radio repeater system in accordance with an embodiment of the present invention. The specific embodiment is the same as described above. Thus, only the operation procedure will be described briefly.

First, the MIMO donor antenna 240 receives MIMO signals from base stations at step S601.

Then, the beamforming control unit 251 controls beamforming by adaptively applying a phase weight to the signals received through the MIMO donor antennas 240 at step S602.

Then, the interference signal cancellation unit 252 estimates and analyses feedback interference signals introduced to the MIMO donor antenna from the MIMO service antenna 260 and adaptively cancels the feedback interference signals, at step S603.

Then, the MIMO service antennas 260 transmit the MIMO signals to radio terminals in a service area.

Figure 7:
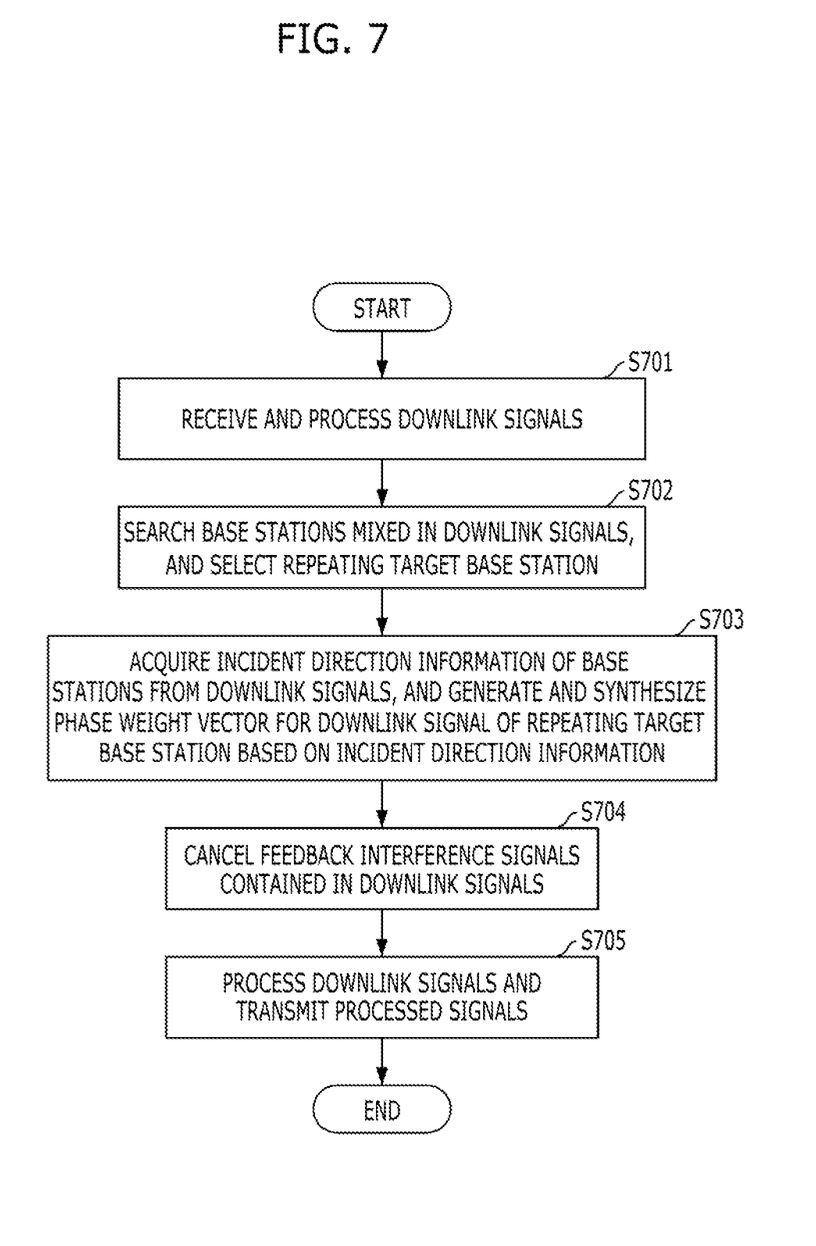
FIG. 7 is a flowchart for an operating method of a radio repeater apparatus in accordance with an embodiment of the present invention.

FIG. 7 is a flowchart for an operating method of a radio repeater apparatus in accordance with an embodiment of the present invention. The specific embodiment is the same as described above. Thus, only the operation procedure will be described briefly.

First, the Rx signal processing unit 310 receives downlink signals and processes the received signals at step S701.

Then, the base station search unit 320 searches base stations mixed in the downlink signals provided from the Rx signal processing unit 310 and selects a repeating target base station at step S702.

Then, the beamforming control unit 330 acquires incident direction information of the base stations from the downlink signals provided from the Rx signal processing unit 310, and generates and synthesizes a phase weight vector for the downlink signal of the repeating target base station based on the incident direction information, at step S703.

At this time, the beamforming control unit 330 acquires phase information of the searched base stations from the horizontal polarization or vertical polarization signals provided from the Rx signal processing unit 310, estimates the phase vectors of the searched base stations from the acquired phase information, generates phase weight vectors from the estimated phase vectors such that the repeating target base signal has the maximum SNR, and synthesizes the horizontal polarization and vertical polarization signals provided from the Rx signal processing unit 310 and the generated phase weight vectors, thereby outputting the synthesized horizontal polarization signals and the synthesized vertical polarization signals. At this time, the beamforming control unit 30 may generate the phase weight vectors such that the channel response of the synthesized horizontal polarization signals is independent of the channel response of the synthesized vertical polarization signals.

Then, the adaptive interference cancellation unit 340 cancels feedback interference signals contained the downlink signal from the beamforming control unit 330 at step S704.

Then, the Tx signal processing unit 350 processes the downlink signals from the adaptive interference cancellation unit 340 and then transmits the processed signal at step S705.

The above-described embodiments of the present invention may apply the dual polarization array antennas to the donor antennas of the radio repeater apparatus having a feedback interference cancellation function, thereby strengthening a target base station signal among a plurality of base station signals mixed in downlink signals and suppressing the other base station signals through digital beamforming. The embodiments of the present invention may improve repeating quality in downtown where the density of base stations is high, and stably provide the service. The embodiments of the present invention may be applied to radio communication systems.

In accordance with the embodiments of the present invention, the radio repeater system includes the beamforming array antennas applied as the donor antenna and has the adaptive digital phase control function and the adaptive feedback interference signal cancellation function, thereby avoiding the interference between the base stations and improving the repeating quality of downlink signals.

Furthermore, the radio repeater system transmits MIMO signals in a repeating section, thereby improving the frequency use efficiency.

Furthermore, the radio repeater system operates adaptively in change of radio channel environment and cancels feedback interference signals, thereby improving the stability of radio repeated signals.

While the present invention has been described with respect to the specific embodiments, it will be apparent to those skilled in the art that various changes and modifications may be made without departing from the spirit and scope of the invention as defined in the following claims.

What is claimed is:

1. A radio repeater system comprising:
   a multiple input multiple output (MIMO) donor antenna configured to transmit/receive MIMO signals to/from base stations;
   a beamforming control unit configured to control beamforming by adaptively applying a phase weight to repeated MIMO signals received from the MIMO donor antenna, wherein the phase weight is based on acquired incident direction information from the base stations such that the repeated MIMO signals of a target base station have a maximum signal-to-noise ratio (SNR);
   an interference signal cancellation unit configured to estimate and analyze feedback interference signals introduced from a MIMO service antenna to the MIMO donor antenna and adaptively cancel the feedback interference signals from the repeated MIMO signals; and
   the MIMO service antenna configured to transmit/receive the repeated MIMO signals to/from radio terminals in a service area.

2. The radio repeater system of claim 1, wherein the MIMO donor antenna comprises a plurality of dual polarization array antennas configured to receive horizontal polarization and vertical polarization signals from the base stations.

3. The radio repeater system of claim 1, wherein the MIMO donor antenna and the beamforming control unit are integrated with each other.

4. The radio repeater system of claim 1, wherein the beamforming control unit traces a repeating target base station signal from the repeated MIMO signals received through the MIMO donor antenna, and wherein the phase weight strengthens the repeating target base station signal and suppresses other base station signals, in order to control beamforming.

5. A radio repeater apparatus comprising:
   a receive (Rx) signal processing unit configured to receive and process downlink signals;
   a base station search unit configured to search base stations mixed in the downlink signals from the Rx signal processing unit, and select a repeating target base station;
   a beamforming control unit configured to acquire incident direction information of the base stations from the downlink signals provided from the Rx signal processing unit, and generate and synthesize a phase weight vector for the downlink signal of the repeating target base station based on the acquired incident direction information;

an adaptive interference cancellation unit configured to cancel feedback interference signals contained in the downlink signals from the beamforming control unit; and a transmit (Tx) signal processing unit configured to process the downlink signals provided from the adaptive interference cancellation unit and transmit the processed signals, wherein the beamforming control unit acquires incident direction information of the base stations searched by the base station search unit from the downlink signals provided from the Rx signal processing unit, and generates and synthesizes phase weight vectors on the basis of the acquired incident direction information such that the downlink signal of the repeating target base station selected by the base station search unit has a maximum signal-to-noise ratio (SNR).

6. The radio repeater apparatus of claim 5, wherein the Rx signal processing unit receives a plurality of horizontal polarization and vertical polarization signals from dual polarization array antennas, and performs band filtering, low-noise amplification, down-conversion, and analog/digital (A/D) conversion.

7. The radio repeater apparatus of claim 5, wherein the base station search unit searches the base stations mixed in the downlink signals provided from the Rx signal processing unit, and selects a base station having the largest signal-to-noise ratio (SNR) among the searched base stations as the repeating target base station.

8. The radio repeater apparatus of claim 5, wherein the adaptive interference cancellation unit cancels the feedback interference signals existing in the downlink signals by adjusting gains and phases of the downlink signals.

9. The radio repeater apparatus of claim 5, wherein the adaptive interference cancellation unit comprises:
   a feedback interference signal detection section configured to detect and update phases and magnitudes of the feedback interference signals from the downlink signals provided from the beamforming control unit and containing the feedback interference signals;
   a negative feedback interference signal generation section configured to generate negative feedback interference signals of the feedback interference signals contained in the downlink signals, using the phases and magnitudes of the feedback interference signals received from the feedback interference signal detection section; and
   a feedback interference signal cancellation section configured to synthesize the downlink signals and the negative interference signals generated from the negative feedback interference signal generation section and transmit the downlink signals, from which the feedback interference signals are canceled, to the Tx signal processing unit.

10. The radio repeater apparatus of claim 5, wherein the adaptive interference cancellation unit comprises:
   a first adaptive interference cancellation section configured to detect feedback interference signals from the horizontal polarization signals synthesized by the beamforming control unit and cancel the detected feedback interference signals; and
   a second adaptive interference cancellation section configured to detect feedback interference signals from the vertical polarization signals synthesized by the beamforming control unit and cancel the detected feedback interference signals.

11. The radio repeater apparatus of claim 5, wherein the Tx signal processing unit performs D/A conversion, up-conversion, amplification, and band filtering on the horizontal polarization and vertical polarization signals from which the feedback interference signals are canceled by the adaptive interference cancellation unit.

12. The radio repeater apparatus of claim 5, wherein the beamforming control unit comprises:
   a horizontal polarization collector configured to collect horizontal polarization signals from the Rx signal processing unit;
   a first reference signal correlator configured to generate correlation values between the horizontal polarization signals provided from the horizontal polarization collector and first reference signals corresponding to horizontal polarization;
   a first phase weight vector generator configured to estimate first phase vectors of the searched base stations from the correlation values provided from the first reference signal correlator, and generate phase weight vectors from the estimated first phase vectors such that the repeating target base station has the maximum SNR;
   a vertical polarization collector configured to collect vertical polarization signals from the Rx signal processing unit;
   a second reference signal correlator configured to generate correlation values between the vertical polarization signals provided from the vertical polarization collector and second reference signals corresponding to vertical polarization;
   a second phase weight vector generator configured to estimate second phase vectors of the searched base stations from the correlation values provided from the second reference signal correlator, and generate phase weight vectors from the estimated second phase vectors such that the repeating target base station has the maximum SNR;
   a phase weight vector synthesizer configured to synthesize the horizontal polarization and vertical polarization signals provided from the Rx signal processing unit and the phase weight vectors generated from the first and second phase weight vector generators; and
   a channel estimator configured to provide channel response correlation values of the synthesized horizontal polarization and vertical polarization signals outputted from the phase weight vector synthesizer to the first and second phase weight vector generators, in order to generate the phase weight vectors such that channel response of the synthesized horizontal polarization signals is independent of channel response of the synthesized vertical signals.

13. The radio repeater apparatus of claim 12, wherein the phase weight vector synthesizer comprises:
   a first phase weight vector synthesizer configured to synthesize the plurality of horizontal polarization signals provided from the Rx signal processing unit and the plurality of phase weight vectors generated from the first phase weight vector generator; and
   a second phase weight vector synthesizer configured to synthesize the plurality of vertical polarization signals provided from the Rx signal processing unit and the plurality of phase weight vectors generated from the second phase weight vector generator.

14. An operating method of a radio repeater system, comprising:
- receiving MIMO signals including repeated signals from base stations;
- controlling beamforming by adaptively applying phase weights to the received repeated MIMO signals, wherein the phase weights are based on acquired incident direction information from the base stations such that the repeated MIMO signals of a target base station have a maximum signal-to-noise ration (SNR);
- estimating and analyzing feedback interference signals introduced to the received repeated MIMO signals and adaptively canceling the feedback interference signals; and
- transmitting the repeated MIMO signals to radio terminals in a service area.

15. An operating method of a radio repeater apparatus, comprising:
- receiving downlink signals and processing the received signals;
- searching base stations mixed in the processed downlink signals and selecting a repeating target base station;
- acquiring incident direction information of the base stations from the processed downlink signals, and generating and synthesizing a phase weight vector for the downlink signal of the repeating target base station, based on the acquired incident direction information;
- canceling feedback interference signals contained in the downlink signals synthesized with the phase weight vector; and
- processing the downlink signals from which the feedback interference signals are canceled, and transmitting the processed signals, wherein said acquiring the incident direction information of the base stations from the processed downlink signals, and generating and synthesizing the phase weight vector for the downlink signal of the repeating target base station, based on the acquired incident direction information comprises:

- acquiring phase information of the searched base stations from horizontal polarization or vertical polarization signals;
- estimating phase vectors of the searched base stations from the acquired phase information, and generating phase weight vectors from the estimated phase vector such that the repeating target base station signal has a maximum signal-to-noise ratio (SNR); and
- synthesizing the horizontal polarization and vertical polarization signals and the generated phase weight vectors and outputting the synthesized horizontal polarization and vertical polarization signals, and said estimating the phase vectors of the searched base stations from the acquired phase information, and generating the phase weight vectors from the estimated phase vector such that the repeating target base station signal has the maximum signal-to-noise ratio (SNR) comprises generating the phase weight vectors such that channel responses of the synthesized horizontal polarization and vertical polarization signals are independent.

* * * * *